United States Patent [19]

Broussaud

[11] 4,397,016

[45] Aug. 2, 1983

[54] PROCESS FOR SWITCHING TIME-MULTIPLEXED SIGNALS TRANSMITTED ON A CARRIER, INCLUDING IN PARTICULAR AN OPTICAL CARRIER, AND A DEVICE EMBODYING THIS PROCESS

[75] Inventor: Georges J. G. Broussaud, Colombes, France

[73] Assignee: Thomson-CSF Telephone, Colombes, France

[21] Appl. No.: 194,891

[22] Filed: Oct. 7, 1980

[30] Foreign Application Priority Data

Oct. 10, 1979 [FR] France ............................ 79 25200

[51] Int. Cl.³ ............................................ H04Q 11/04
[52] U.S. Cl. ........................................ 370/4; 370/58
[58] Field of Search .................. 370/4, 112, 1, 53, 84, 370/85, 86, 99, 58, 63, 77, 100

[56] References Cited

U.S. PATENT DOCUMENTS

| | | | |
|---|---|---|---|
| Re. 29,215 | 5/1977 | Carney et al. | 370/84 |
| 3,986,020 | 10/1976 | Kogelnik | 370/53 |
| 4,160,128 | 7/1979 | Texier | 370/84 |
| 4,244,046 | 1/1981 | Brouard et al. | 370/84 |

FOREIGN PATENT DOCUMENTS

| | | |
|---|---|---|
| 2012392 | 3/1970 | France . |
| 2125084 | 4/1972 | France . |
| 53-117311 | 10/1978 | Japan . |

OTHER PUBLICATIONS

Electronic Design 20, vol. 26, 1978, "Electro-Optic Crystal Devices Supply Missing Fiber-Optic Links".
Patent Abstracts of Japan, vol. 2, No. 149, Dec. 13, 1978, p. 3459 E 78, "Time-Division Light Network".

Primary Examiner—Douglas W. Olms
Attorney, Agent, or Firm—Oblon, Fisher, Spivak, McClelland & Maier

[57] ABSTRACT

The switching device includes an array (1) with space-division switching by directional couplers without signal memorization, directional couplers ($2_1, \ldots 2_r$), detectors ($3_1, \ldots 3_r$) and receivers ($4_1, \ldots 4_r$) connected to a processor which controls the switching of the couplers of the array (1) via an interface circuit (6). The processor reinserts in the output channels switching control signals and synchronization signals via converters ($8_1, \ldots 8_s$) and couplers ($7_1, \ldots 7_s$).

4 Claims, 5 Drawing Figures

PROCESS FOR SWITCHING TIME-MULTIPLEXED SIGNALS TRANSMITTED ON A CARRIER, INCLUDING IN PARTICULAR AN OPTICAL CARRIER, AND A DEVICE EMBODYING THIS PROCESS

BACKGROUND OF THE INVENTION

1. Field of the Invention

The present invention relates to a process for switching time-multiplexed signals transmitted on a carrier, as well as to a device embodying this process.

2. Description of the Prior Art

The process of time-division switching presently used in digital telephone exchanges consists essentially in transferring each sample of the incident signal transmitted by the calling party from the time slot corresponding to this calling party to the time slot of the called party. Such transfer requires the memorization of incident samples for an interval depending on the time slots allocated to the calling and called parties. Such memorization, however, is possible only with immobilizable physical supports such as electrical charges or magnetic domains. It is not possible to immobilize and memorize electromagnetic radiation carrying signals, including in particular light.

If it is required to switch signals modulating light propagating, for example, through glass fibers, the light signal must first be converted into an electrical signal, the latter must then be processed conventionally, and the resulting electrical signal must again be converted into another light signal. This double conversion does not allow all the advantages that could be obtained by transmitting multiplexed signals over optical paths.

SUMMARY OF THE INVENTION

The subject of the present invention is a process allowing the switching of time-multiplexed signals transmitted on a carrier, including in particular an optical carrier, without the necessity of memorizing the signals during the actual switching phase.

The present invention also proposes a device for embodying this process.

The process in accordance with the present invention consists, before modulating the optical carrier, in:
sampling if required and in a conventional manner the m signals from m sources to be multiplexed over the same transmission channel or on the input channel,
repeating of the samples n times in succession, n being a whole number greater than or equal to 2,
time-multiplexing the m groups of n times the same sample, followed by a conventional modulation of the carrier applied to the input channel, and in order to switch this input channel to another channel or output channel, selection of p successive samples amongst the n successive identical samples of each group of n times the same sample spatially transferred to a time slot of said output channel, this time slot occurring at the same time as at least some of said p samples out of the n samples, this part containing all the data of at least one sample.

According to another aspect of the process proposed by the present invention, when several different input channels are switched to the same output channel, since all these channels have the same time-multiplexing period, the number of output channel time slots must be equal to the product of the total number of time slots of all said input channels and the number p of samples selected amongst the groups of n samples, the number n being determined such that the multiplexing period of the signal of each input channel is completely occupied by samples, such that there is no overlapping of the samples on the output channel and such that all the input samples can be obtained on the output channel.

The device embodying the process proposed by the present invention comprises essentially a switching array spatially transferring modulated input carriers to one or more outputs of the array, each array input being associated with a directional coupling device with a device detecting the modulating signal and a device detecting switching control signals and/or synchronization signals, all said control and synchronization signal detection devices being connected to a processor itself connected to the control inputs of the switching array via interface circuits, and to the outputs of this array via other directional couplers.

In the preferred version of the device proposed by the present invention for switching signals transmitted optically through glass fibers, the switching array possesses several directional couplers arranged in a known manner such that any input can be switched to any output.

BRIEF DESCRIPTION OF THE DRAWINGS

The present invention may be more clearly understood from the detailed description of several non-restrictive illustrative embodiments, with reference to the appended drawing in which.

DETAILED DESCRIPTION OF THE PREFERRED EMBODIMENTS

Figure 1:
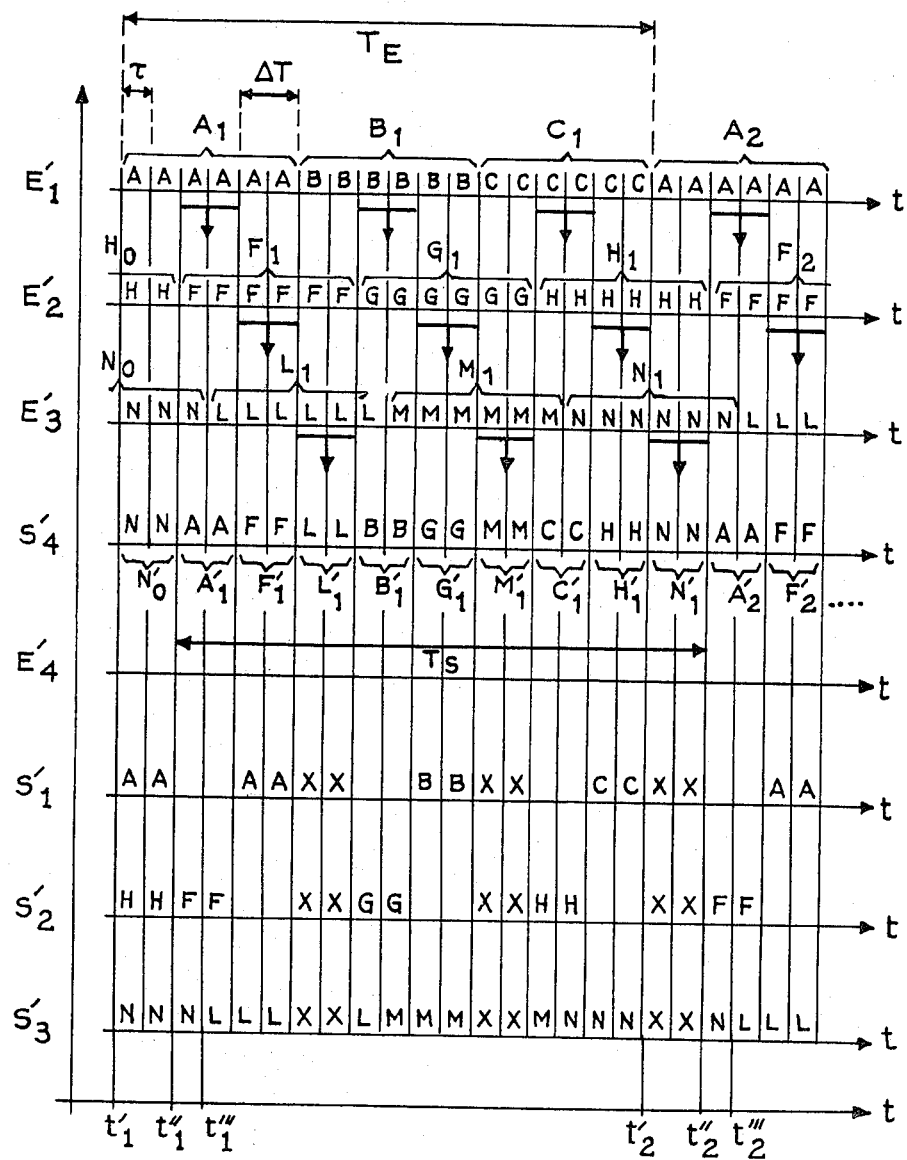
FIG. 1 is a timing diagram illustrating a simplified example of the switching process in accordance with the present invention.

The timing diagram in FIG. 1 illustrates the process in accordance with the present invention in the simplified case where it is required to switch three input channels $E'_1$, $E'_2$ and $E'_3$ to an output channel $S'_4$, each of these three input channels transmitting three time-multiplexed paths. Since the preferred version of the switching array used for embodying this process has the configuration shown in FIG. 3, this configuration being described below, and since this preferred array comprises four inputs and four outputs, the timing diagram shown in FIG. 1 comprises four lines relating to the four inputs $E_1$ to $E_4$ and four lines relating to the four outputs $S_1$ to $S_4$. Since as explained below the maximum switching capacity is reached in the given hypothesis, however, no signal can be applied to the fourth input $E_4$. In addition, again for the same hypothesis, all the incident signals are obtained on a single output channel $S'_4$, this output channel corresponding to output $S_4$ of said switching array. As explained below, however, since four outputs are available, any of these may be used if it is required to proces only one output channel, and several of them could be used if it is required to obtain certain data on several channels at the same time, as explained below.

It should also be noted that the process proposed by the present invention is not limited to the use of a given switching array, and many other configurations of switching arrays could be envisaged, provided the immediate transfer of selected samples is allowed from one channel to another.

In the case of the timing diagram in FIG. 1, sources A, B and C are applied to channel $E'_1$, sources F, G and H are applied to channel $E'_2$, and sources L, M and N are applied to channel $E'_3$. If the signals produced by these nine sources are of an analog nature, they are sampled in a conventional manner. If these signals are in digital form, they are converted if required to enable them to be processed as conventional sampled signals. The output channel is selected by the control signals inserted in each input channel, these control signals being obtained, for example, from one of the above-mentioned sources.

In accordance with the process proposed by the present invention, each sample of each signal source is repeated n times in succession, n being a whole number greater than or equal to 2. In addition, two samples, for example, are selected each time from the groups of n times the same sample repeated in succession for subsequent transfer to the output channel $S'_4$. Eighteen samples should thus be obtained on the output channel $S'_4$ during one multiplexing period. The multiplexing period $T_s$ of the signal on output channel $S'_4$ should therefore comprise eighteen time slots $\tau$. If a larger number of input channels or sources are to be switched to the output channel, however, the length of period $T_s$ is increased in consequence. To avoid the loss of data, the period $T_s$ of the output channel signal should be equal to the period of the signal of each input channel.

Again in accordance with the process proposed by the present invention, each sample being repeated n times in succession, the number n is determined such that the multiplexing period $T_E$ of the signal of each input channel is completely occupied by samples. In the present case, the period $T_E$ comprises eighteen time slots and three signal sources are multiplexed on each input channel, whence n=6.

The timing diagram in FIG. 1 starts at an instant $t'_1$, at which appears the first sample of source A relative to the sampling instant $\theta_1$ of the above-mentioned source signals. This timing diagram allows for mutual phase differences inevitable in practice between the three input channels. In the present case, it is assumed for the sake of clarity of the drawing that these phase differences with respect to channel $E'_1$ considered as the reference are equal to two and three time slots for channels $E'_2$ and $E'_3$ respectively. In reality, these phase difference are random, but as explained below the process proposed by the present invention overcomes the problems due to a phase difference which is not a whole number of time slots. Thus for the sampling instant $\theta_1$, the first samples of channels $E'_2$ and $E'_3$ appear at instants $t''_1$ and $t'''_1$ respectively. Consequently, on channel $E'_2$, the last samples relating to the previous sampling instant $\theta_0$ appear between instants $t'_1$ and $t''_1$, and on channel $E'_3$, the last samples relating to instant $\theta_0$ appear between instants $t'_1$ and $t'''_1$.

The groups of six times the same sample relating to instant $\theta_1$ for sources A, B, C, F, G, H, L, M and N are designated $A_1$, $B_1$, $C_1$, $F_1$, $G_1$, $H_1$, $L_1$, $M_1$ and $N_1$ respectively.

In order to switch the three input channels $E'_1$, $E'_2$ and $E'_3$ to the output channel $S'_4$, two successive samples are selected during a lapse of time $\Delta T$ from the six identical successive samples of each group mentioned above. Thus, for example, on channel $E'_1$, the third and fourth samples are selected, on channel $E'_2$, the fifth and sixth samples are selected, and on channel $E'_3$, the seventh and eighth samples are selected. Because of the mutual phase differences between the input channels, it is seen that no overlapping in time of the different successive samples occurs. The selected samples are immediately transferred spatially to the output channel $S'_4$. Groups diminished by two samples are thus obtained on $S'_4$, designated in the order $A'_1$, $F'_1$, $L'_1$, $B'_1$, $G'_1$, $M'_1$, $C'_1$, $H'_1$ and $N'_1$, which correspond to the samples relating to instant $\theta_1$ of the source signals A, F, L, B, G, M, C, H and N respectively. This process repeats in the same manner for the samples relating to following sampling instants $\theta_2$, $\theta_3$, etc.

Consequently, samples from all the sources considered are obtained on the output channel $S'_4$. For subsequent processing of said reduced groups of samples, a single sample per reduced group is selected in an appropriate manner. In the theoretical case described above, for which the phase differences between the various input channels are eqaul to a whole number of time slots, it would obviously be sufficient to select a single sample out of the n identical samples. In practice, however, these phase differences are random and it is necessary to select at least two identical samples. If during the first lapse of selection time $\Delta T$, the third and fourth samples of group $A_1$ only are selected, during the next lapse of time $\Delta T$ only the beginning of the third sample, the whole of the fourth sample and the end of the fifth sample of group $F_1$ could be selected. It would then suffice at the instant of processing channel $S'_1$ to recognize at least one of the two extremities (start or end) of the samples in order to reconstitute the true sequence of the pulses composing them.

In order to synchronize the output channel with the input channels, it is possible, as in the case of PCM telephony, to reserve one of the time slots of each input channel for alignment signals. The last three lines of the timing diagram in FIG. 1 represent the output signals of channels $S'_1$, $S'_2$ and $S'_3$ corresponding to outputs $S_1$, $S_2$ and $S_3$ of the switching device described below with reference to FIG. 3, when this device is used for embodying the process proposed by the present invention. It is obvious, however, that many other switching devices may be used for embodying this process, for optical carriers as well as other electromagnetic carriers.

As may be verified later in the light of the description of the switch in FIG. 3, the first two time slots of period Te in the line of FIG. 1 corresponding to channel $S'_1$ and starting at instant $t'_1$ receive the sample from source A, whilst during the next two time slots, it is input $E_u$ which is switched to output $S_1$ and there is therefore no signal on this output.

During the following fifth and sixth time slots, source A is again switched to channel $S'_1$. During the seventh and eighth time slots, i.e. whilst source L of channel $E'_3$ is switched to channel $S'_4$, any of the three other input channels may be switched to output channel $S'_1$, and it is for this reason that an X has been entered in the seventh and eighth time slots. During the other time slots of period $T_E$ starting at instant $t'_1$, taken in pairs, the following are obtained on channel $S'_1$: no signal, source B, X, no signal, and source C. It is thus seen that on output channel $S'_1$ may be obtained the three sources of the corresponding input channel $E'_1$, and possibly three of the six sources of the remaining two input channels by appropriate selection of the corresponding time slots of channel $S'_1$.

By the same type of reasoning as above, it may be easily shown that the switching process proposed by the present invention enables all the data from several input channels to be obtained on an output channel by simple space-division switching, provided the restrictions defined above are respected, i.e. to determine during the output signal period a number of time slots equal to the product of the total number of time-division paths of all the input channels to be switched and the number of samples selected from the groups of n successive identical samples, and to determine the number n such that the multiplexing period of the signal of each input channel is completely occupied by samples.

It is obvious that the fact of repeating each sample n times in succession decreases the transmission capacity of a multiplexed channel, but if the sampling period of the signals to be transmitted is reduced, which is possible with a high-frequency carrier, especially in the case of an optical carrier, it is even possible to increase transmission capacity compared with present conventional links such as PCM telephony. It is also obvious that the process proposed by the present invention allows not only the multiplexing but also the demultiplexing of data sources.

Figure 2:
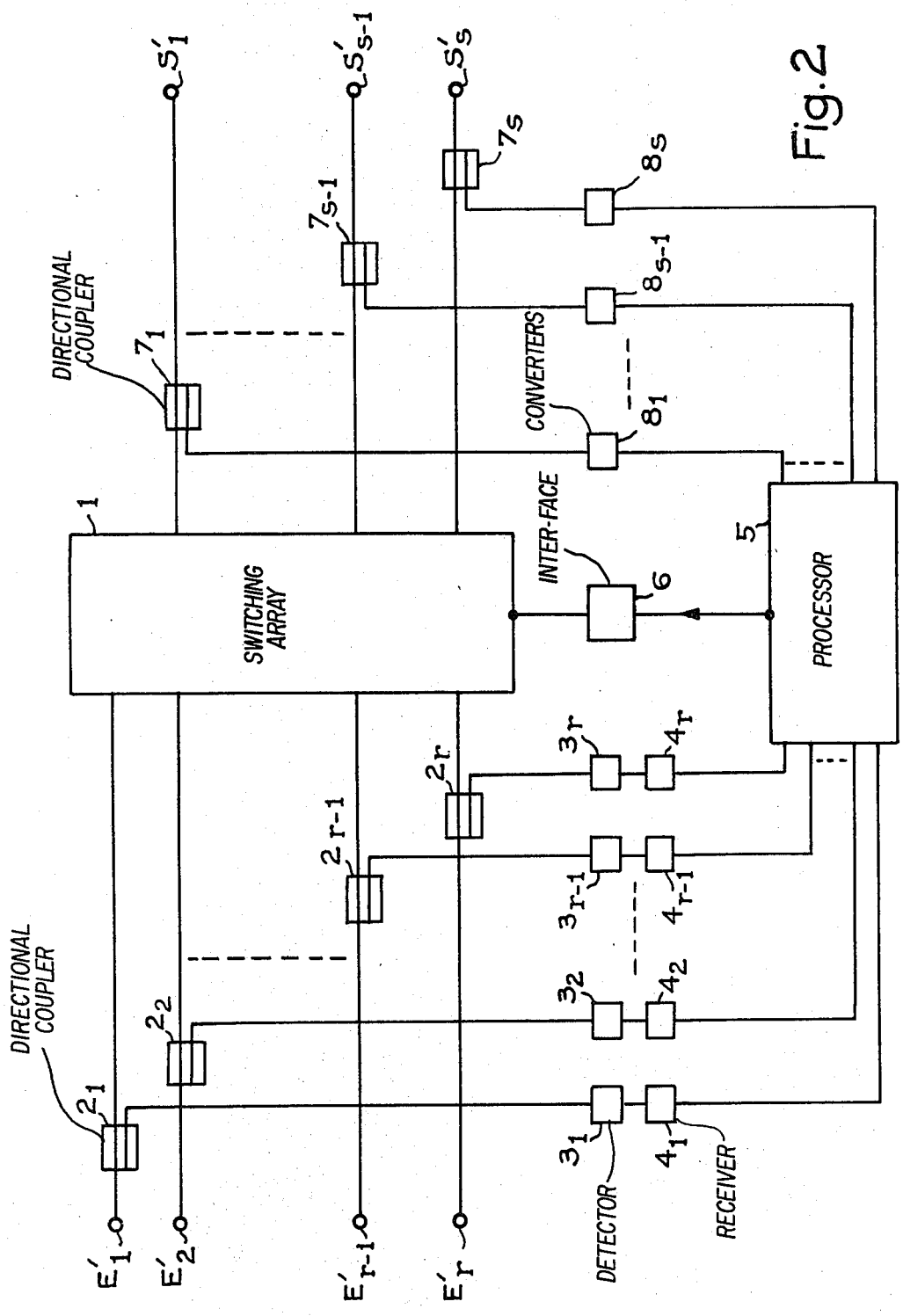
FIG. 2 is a block diagram of one version of the device proposed by the present invention.

FIG. 2 illustrates a practical example of a device embodying the process proposed by the present invention for switching r input channels $E'_1$ to $E'_r$, each carrying several time-multiplexed paths to one or more of the s output channels $S'_1$ to $S'_s$. The r input channels $E'_1$ to $E'_r$ are applied to a switching array 1, of which two illustrative embodiments are described below, and the s output channels $S'_1$ to $S'_s$ leave the array 1. Directional couplers $2_1$ to $2_r$ are inserted in each of the input channels $E'_1$ to $E'_r$ respectively. Each of the r directional couplers $2_1$ to $2_r$ is connected to an appropriate detector $3_1$ to $3_r$ respectively. In the case of optical transmission, detectors $3_1$ or $3_r$ are of the photo-electric type. Detectors $3_1$ to $3_r$ are followed by receivers $4_1$ to $4_r$, these receivers being devices capable of separating the switching control signals and the alignment or synchronization signals transmitted by each of the corresponding input channels. Receivers $4_1$ to $4_r$ are connected to a processor 5 processing said control and alignment signals and generating from these signals the orders for switching array 1. The order signals produced by processor 5 are sent to an interface circuit 6 producing the voltages or signals required for switching the elements constituting array 1. If required, receivers $4_1$ to $4_r$ may constitute part of the processor 5.

If it is required to reinsert in the output channels of the switching device described above other switching orders and/or other alignment signals, processor 5 is made to generate appropriate data which are sent by the processor to directional couplers $7_1$ to $7_s$ inserted in output channels $S'_1$ to $S'_s$ respectively, couplers $7_1$ to $7_s$ being connected to the processor 5 via appropriate converters $8_1$ to $8_s$ respectively. In the case mentioned above or an optical carrier, converters $8_1$ to $8_s$ are of the photo-electric type.

Figure 3:
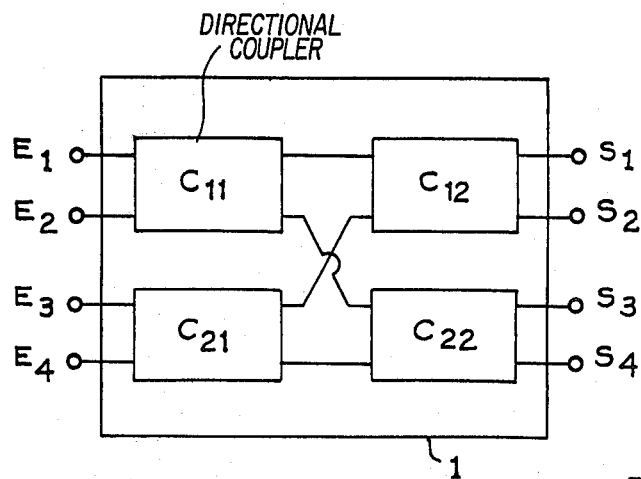
FIG. 3 is a block diagram of the switching array shown in FIG. 2, in the case where this array comprises four inputs and four outputs.

FIG. 3 represents an illustrative embodiment of array 1 using directional couplers. In the case of an optical carrier, these directional couplers may, for example, be so-called "COBRA" couplers or switches described in pages 13 to 24 of the 77th issue of the review entitled "Entropie" published in 1977.

The first two inputs $E_1$ and $E_2$ of array 1 are connected to the two inputs of a first coupler $C_{11}$, and the two other inputs $E_3$ and $E_4$ are connected to the inputs of a second coupler $C_{21}$. The first outputs of $C_{11}$ and $C_{21}$ are connected to the inputs of a third coupler $C_{12}$, and the second outputs of $C_{11}$ and $C_{21}$ are connected to the inputs of a fourth coupler $C_{22}$. The outputs of $C_{12}$ and $C_{22}$ are connected to outputs $S_1$ to $S_4$ of array 1. For the sake of clarity of the drawing, the control electrodes of these four couplers are not shown, their connection being obvious for a person versed in the art.

Figure 4:
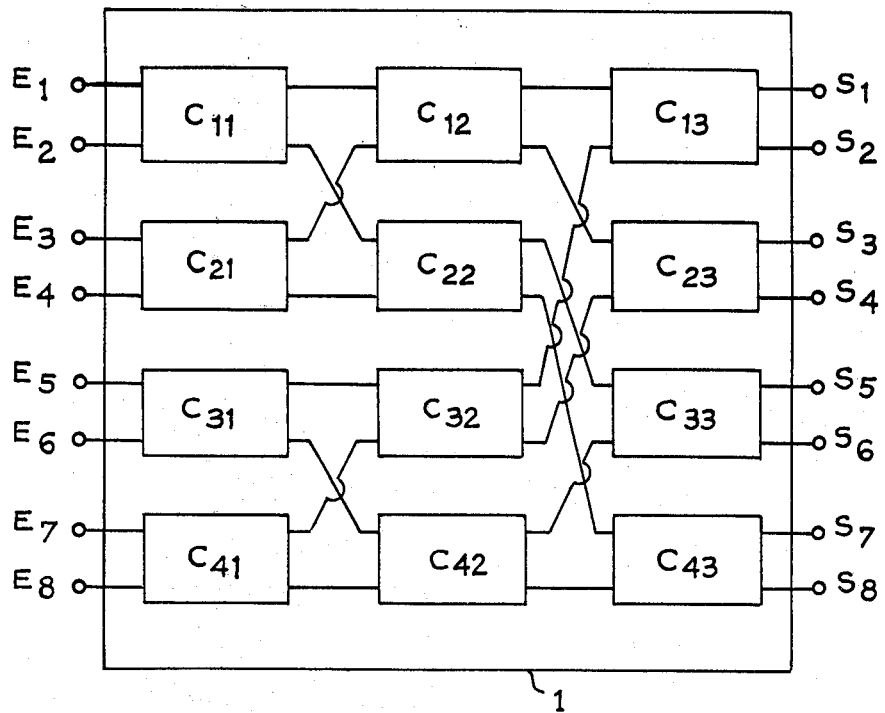
FIG. 4 is a block diagram of the switching array shown in FIG. 2, in the case where this array comprises eight inputs and eight outputs.

FIG. 4 shows another illustrative embodiment of array 1, with the same couplers but possessing eight inputs and eight outputs.

As in the case of FIG. 3, couplers $C_{11}$, $C_{12}$, $C_{21}$ and $C_{22}$ are connected to inputs $E_1$ to $E_4$ of the array and are interconnected in the same manner. Another group of four couplers $C_{31}$, $C_{32}$, $C_{41}$ and $C_{42}$ are arranged respectively in the same manner as the first four mentioned above and connected to inputs $E_5$ to $E_8$ of array 1. The outputs of $C_{12}$ and $C_{22}$ are connected to the first inputs of four other couplers $C_{13}$, $C_{23}$, $C_{33}$ and $C_{43}$ respectively, and the outputs of $C_{32}$ and $C_{42}$ are connected to the second inputs of said four other couplers $C_{13}$ to $C_{43}$ respectively. The outputs of these four other couplers $C_{13}$ to $C_{43}$ are connected to outputs $S_1$ to $S_8$ respectively of array 1.

FIG. 4 illustrates an example of application of the switching device in accordance with the present invention. This example of application concerns a network of telecommunications between subscribers and an urban exchange, these telecommunications covering not only telephone services, but also many other services such television, telex, "Videotex", etc. There presently exist glass-fiber transmission installations, but the operations of switching, multiplexing and demultiplexing are performed by electronic means only, requiring the provision at the ends of each optical fiber of either a source of light easily modulated (opto-electronic diode or laser) or a detection device, such as an opto-electronic diode. Such constraint is all the less tolerable for "local" links less than 50 km in length, for example, for which attenuation produced by the optical fibers is sufficiently small to avoid the necessity of regenerating the transmitted signal. The switching device proposed by the present invention largely overcomes such disadvantages, especially when it is required to switch eight channels or less, in which case an array such as that shown in FIG. 4 results in attenuation still tolerable (approximately 1 to 3 dB per coupler). This device proposed by the present invention may be associated with slower mechanical or electromechanical devices for switching beams of light, but resulting in smaller insertion losses, or even with conventional electronic devices. The example of application shown in FIG. 4 illustrates such a possible association of switching devices of different types.

Figure 5:
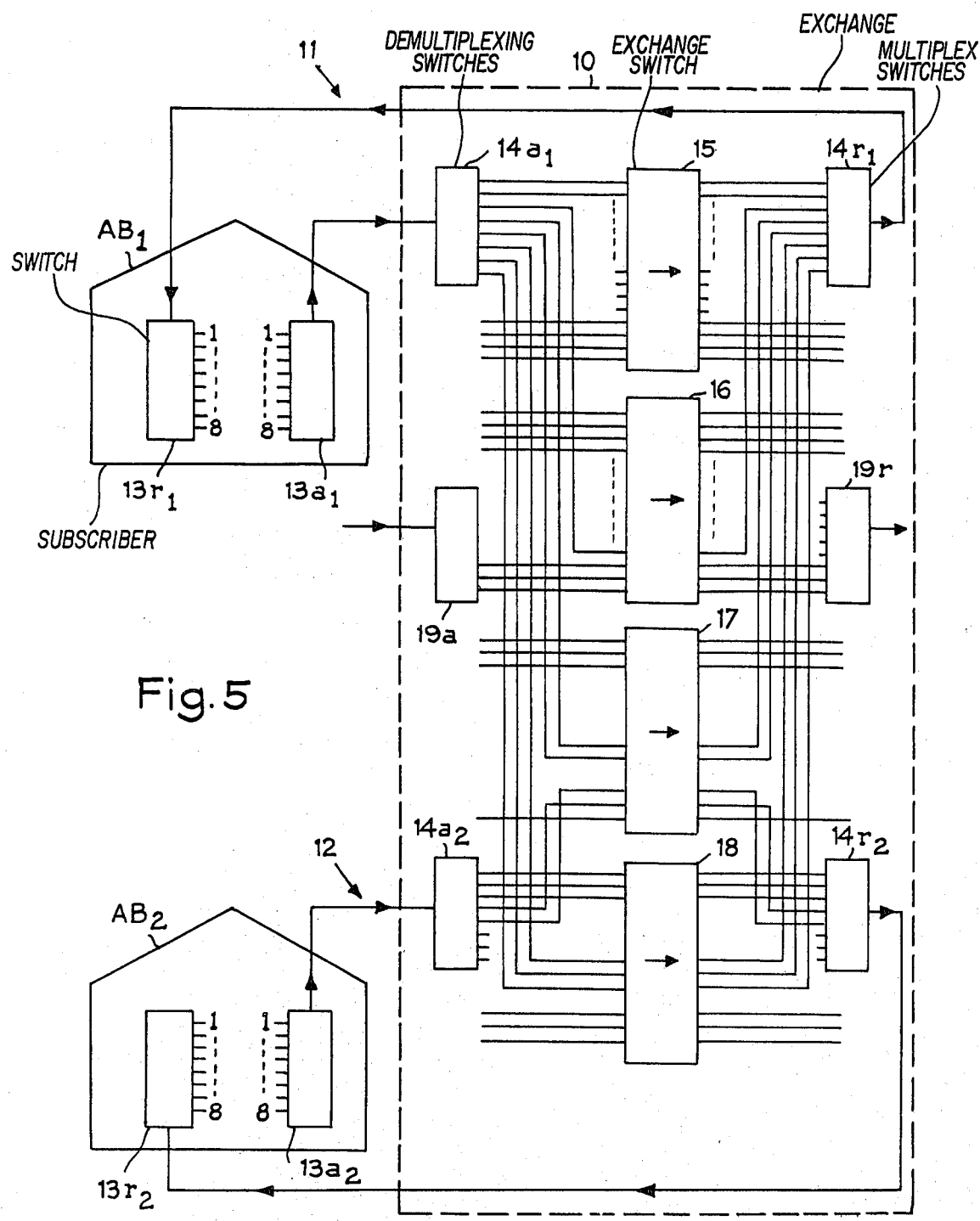
FIG. 5 is a block diagram of an example of application of the device proposed by the present invention.

FIG. 5 represents an urban exchange 10 connected to subscribers such as $AB_1$ and $AB_2$ via glass-fiber lines 11 and 12 respectively, these lines possessing a fiber in the outward direction from the subscriber to the exchange and another fiber for the inward direction from the exchange to the subscriber. Each subscriber possesses several transmission channels, eight in the present case, capable of simultaneously transmitting several different services such as telephone, television, Videotex, etc., each of these eight channels being specifically assigned to a particular service and possessing its own identification number. Since transmission is over glass fibers, television signals are transmitted under excellent conditions. The various signals produced by subscribers $AB_1$ and $AB_2$ are time-multiplexed by switches $13a_1$ and $13a_2$ respectively, carried by the outward fibers of lines 11 and 12 to exchange 10, where they are demultiplexed by switches $14a_1$ and $14a_2$. The various signals transmitted by exchange 10 to these subscribers are multiplexed by switches $14r_1$ and $14r_2$, carried by the inward fibers of lines 11 and 12, and demultiplexed when reaching subscribers $AB_1$ and $AB_2$ by switches $13r_1$ and $13r_2$ respectively. All the above switches may with advantage be in accordance with the present invention.

In exchange 10, the exchange switches such as the four switches 15, 16, 17 and 18 connect subscribers to the various information distribution networks via switches 13a, 13r, 14a and 14r mentioned above. Each of the exchange switches such as switches 15 to 18 may be assigned to a particular service and connected to the specific corresponding channel of demultiplexers 14a or multiplexers 14r. Switches such as 15 to 18 are preferably of an optical type with electromechanical control if the called subscriber is in a region directly accessible by optical transmission, i.e. without regeneration or amplification of the signal transmitted by the calling party. For example, this is the case of switch 17 enabling subscriber $AB_1$ to enter into bothway communication with subscriber $AB_2$ by optical switching via switches $13a_1$, $14a_1$, 17, $14r_2$ and $13r_2$ in one direction and via switches $13a_2$, $14a_2$, 17, $14r_1$ and $13r_1$ in the other. In addition, switch $14r_2$ for example enables subscriber $AB_2$ to receive simultaneously other information transmitted by other subscribers and passing through other exchange switches in exchange 10. If the called subscriber is in a region which is not directly accessible by optical transmission, the links are established by conventional time-division electronic exchanges.

Exchange 10 also comprises switches such as switches 19a and 19r connecting it to other urban exchanges, tandem exchanges, or any other type of exchange. In the case illustrated by FIG. 5, switch 19a is a demultiplexer transmitting external information to exchange 10, and switch 19r is a multiplexer transmitting the information produced by exchange 10 to other exchanges. These two switches 19a and 19r are, for example, connected to the exchange switch 16 and may be of the optical type with electromechanical control or of the electronic type, depending on the nature of the lines providing the links to the other exchanges.

What is claimed is:

1. A process for switching time-multiplexed signals transmitted on a carrier, including in particular a light wave, the signal from m sources to be time-multiplexed on the same transmission channel or input channel, comprising the steps of:
    before modulating the carrier with said signal and their time multiplexing, each of the samples of said signals being repeated n times in succession, n being a whole number greater than or equal to 2;
    the m groups of n times the same sample being time-multiplexed;
    the carrier being modulated in a conventional manner with the samples repeated and multiplexed in this manner; and
    said carrier modulated in this manner being applied to an input channel;
    in order to switch said input channel to another channel, or output channel, p successive samples being selected from the n successive identical samples of each group of n times the same sample and being transferred spatially to a time slot of said output channel, wherein said time slot occurs at the same time as at least some of said p samples out of the n samples, said slot containing all the data of at least one sample.

2. A switching process in accordance with claim 1 for switching several different input channels to the same output channel, said channels all having the same time-multiplexing period, wherein the number of output channel time slots is equal to the product of the total number of time slots of all said input channels and said number p of samples selected amongest the groups of n samples, the number n being determined such that the multiplexing period of the signal of each input channel is completely occupied by samples.

3. A device embodying a process for switching time-multiplexed signals transmitted on a carrier, including in particular a light wave, the signals from m sources to be time-multiplexed on the same transmission or input channel, wherein before modulating the carrier with said signals and their time multiplexing, each of the samples of the signals are repeated n times in succession, n being a whole number greater than or equal to 2, wherein the m groups of n times the same sample are time-multiplexed, wherein the carrier is modulated in a conventional manner with the samples repeated and multiplexed in this manner, and wherein this carrier is modulated in the same manner before being applied to the input channel, and wherein in order to switch said input channel to another channel, p successive samples are selected from the n successive identical samples of each group of n times the same sample and are transferred spatially to a time slot of said output channel, said time slot occurring at the same time as at least one of said p samples out of the n samples, said device comprising a switching array, wherein each array input is associated with a directional coupler device;
    a modulating signal detection device and a switching control and/or synchronization signal detection device;
    receiver means connected to said detection devices for separating the switching control signals and the synchronization signals, said receiver means being in turn connected to means for processing the output of said control and/or synchronization detection devices and generating orders for controlling said switching array.

4. A device in accordance with claim 3 for switching signals transmitted optically through glass fibers, wherein the switching array comprises several directional couplers arranged in a known manner such that any input can be switched to any output.

* * * * *